United States Patent
Mazur

(10) Patent No.: US 11,279,259 B2
(45) Date of Patent: *Mar. 22, 2022

(54) LOAD SUPPORTING AND INSULATING APPARATUSES FOR RAILS

(71) Applicant: Precision Rail and Mfg., Inc., Oak Creek, WI (US)

(72) Inventor: Robert A. Mazur, Greenfield, WI (US)

(73) Assignee: Precision Rail and Mfg., Inc., Oak Creek, WI (US)

( * ) Notice: Subject to any disclaimer, the term of this patent is extended or adjusted under 35 U.S.C. 154(b) by 292 days.

This patent is subject to a terminal disclaimer.

(21) Appl. No.: 16/562,993

(22) Filed: Sep. 6, 2019

(65) Prior Publication Data

US 2020/0023752 A1    Jan. 23, 2020

Related U.S. Application Data

(63) Continuation-in-part of application No. 15/413,935, filed on Jan. 24, 2017, now Pat. No. 10,486,550.

(60) Provisional application No. 62/286,598, filed on Jan. 25, 2016.

(51) Int. Cl.
*B60M 1/30* (2006.01)

(52) U.S. Cl.
CPC .................................. *B60M 1/307* (2013.01)

(58) Field of Classification Search
CPC .............................. B60M 1/302; B60M 1/307
USPC .......................................................... 191/32
See application file for complete search history.

(56) References Cited

U.S. PATENT DOCUMENTS

| | | | |
|---|---|---|---|
| 762,769 A | 6/1904 | Steinberger | |
| 3,566,048 A | 2/1971 | Martin | |
| 3,826,881 A | 7/1974 | Spiringer | |
| 6,423,946 B1 | 7/2002 | Berka et al. | |
| 6,672,441 B1 | 1/2004 | Uremovic | |
| 7,926,634 B1 | 4/2011 | Morales | |
| 8,061,494 B2 | 11/2011 | Rameau et al. | |
| 10,486,550 B2 * | 11/2019 | Mazur | E01B 1/001 |
| 2015/0298578 A1 * | 10/2015 | Parsons | B60M 1/307 |
| | | | 191/44.1 |

FOREIGN PATENT DOCUMENTS

GB    1049129    11/1966

OTHER PUBLICATIONS

Office Action dated Aug. 5, 2021 cited in related Canadian Application No. 3,087,027.

(Continued)

*Primary Examiner* — Zachary L Kuhfuss
(74) *Attorney, Agent, or Firm* — Andrus Intellectual Property Law, LLP

(57) ABSTRACT

Disclosed is a rail supporting assembly for supporting a contact rail of a railway system that includes a base, a rail support head positioned relative to the base, and a support member comprising a dielectric phenolic material coupled to and positioned between the rail support head and the base to thereby support and insulate the contact rail. The support member includes a fracture area to facilitate fracturing of a sidewall of the support member when a fracturing force, such as a electrical arc event, is applied to the support member. The support member preferably is coated with a varnish to prevent absorption of water by the support member.

24 Claims, 6 Drawing Sheets

(56) References Cited

OTHER PUBLICATIONS

Glyptal Inc., "Product Data Sheet 1202", website http://www.hisco.com/Catalog/Paints-Coatings/Inks-Tints-Varnishes/Varnishes/1202G-21717#undefined2 visited Jan. 17, 2017.
Glyptal Inc., "Product Data Sheet 9620", website http://www.hisco.com/Catalog/Paints-Coatings/Inks-Tints-Varnishes/Varnishes/9620G-21717 visited Jan. 17, 2017.
Franklin Fibre-Lamitex Corporation, "Lamitex Grade GE Tube Technical Data", Mar. 15, 2009.
Franklin Fibre-Lamitex Corporation, "Material Data Sheet", Apr. 4, 2012.
Chicago Transit Authority, "Traction Power STandard Drawing", May 4, 2007.

* cited by examiner

LOAD SUPPORTING AND INSULATING APPARATUSES FOR RAILS

CROSS-REFERENCE TO RELATED APPLICATION

The present application is a continuation-in-part of U.S. patent application Ser. No. 15/413,935 filed Jan. 24, 2017, which is based on and claims priority to U.S. Provisional Patent Application Ser. No. 62/286,598 filed on Jan. 25, 2016, the disclosure of which is incorporated herein by reference.

FIELD

The present disclosure relates to load supporting and insulating apparatuses for rails, in particular rail supporting assemblies for railway systems with a contact rail for energizing a vehicle.

BACKGROUND

The following U.S. Patents are incorporated herein by reference in their entireties:

U.S. Pat. No. 762,769 discloses assemblies for supporting a third energized rail of a railway system.

U.S. Pat. No. 6,672,441 discloses a live rail support that has a support body for holding two electrically conductive live rails each having at least one contact sliding surface. The live rails can be inserted into the support body in such a manner that the contact sliding surfaces are arranged parallel to the longitudinal axis of the support body and at an angle to the vertical axis of the support body.

U.S. Pat. No. 7,926,634 discloses a third rail power insulating system that has an insulator assembly and a cover board assembly. The insulator assembly comprises pedestal supporting insulators that are mounted onto a contact rail assembly. The insulator assembly further comprises an insulator anchor bolt assembly, a base shim plate, a bolt assembly, a lubricating shim, and retaining clips. The cover board assembly is also mounted onto the contact rail assembly and it comprises a support bracket assembly, retaining clips, a side cover board, and a top cover board.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a rail supporting assembly for supporting a contact rail of a railway system includes a base, a rail support head, and a support member comprising a dielectric phenolic material coupled to and positioned between the rail support head and the base to thereby support and insulate the contact rail. The support member preferably is coated with a varnish to prevent absorption of water.

Various other features, objects, and advantages will be made apparent from the following description taken together with the drawings.

BRIEF DESCRIPTION OF THE DRAWINGS

The present disclosure is described with reference to the following figures. The same numbers are used throughout the figures to reference like features and like components.

DETAILED DESCRIPTION

Figure 1:
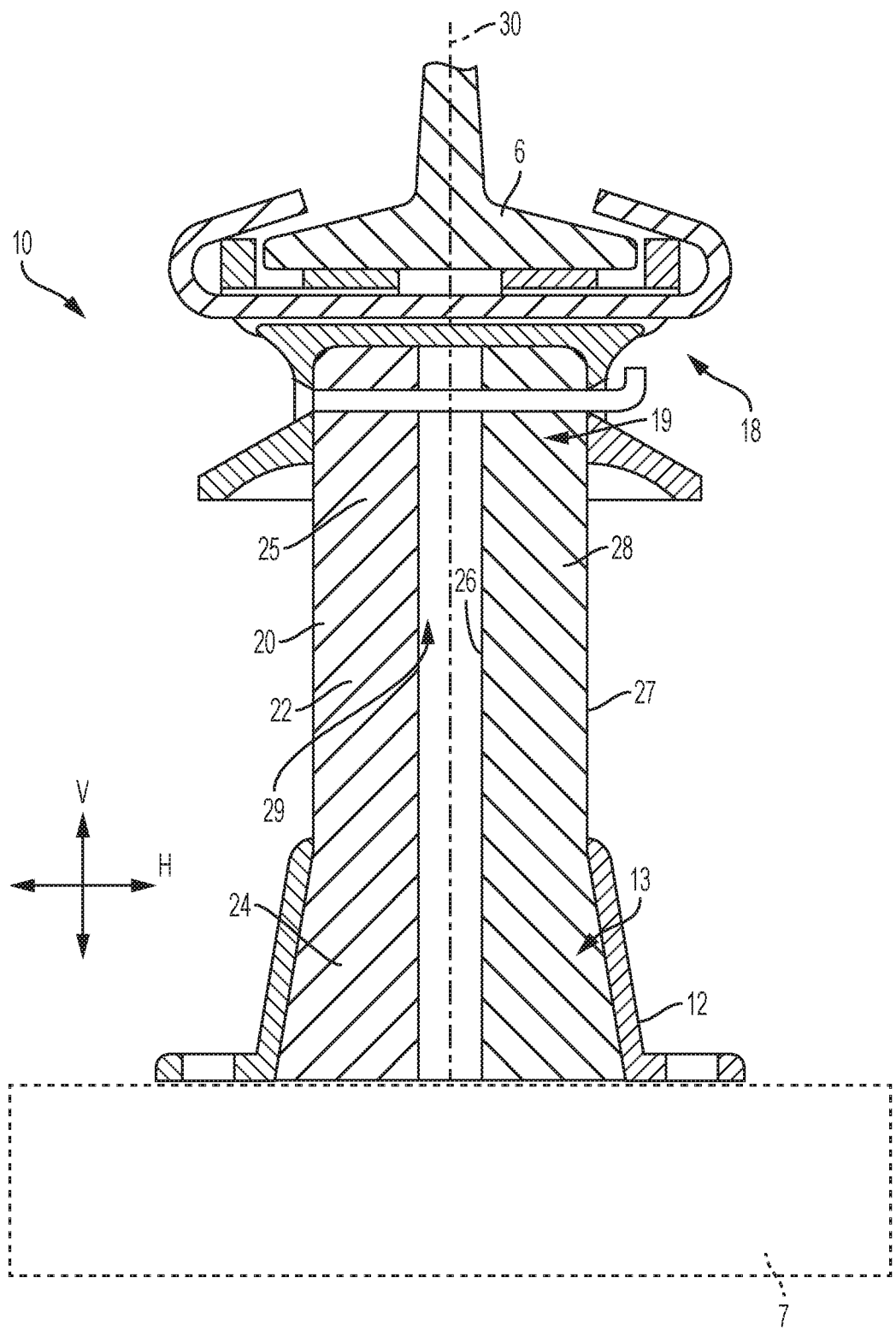
FIG. 1 is a cross section view of an example rail supporting assembly.
Figure 2:
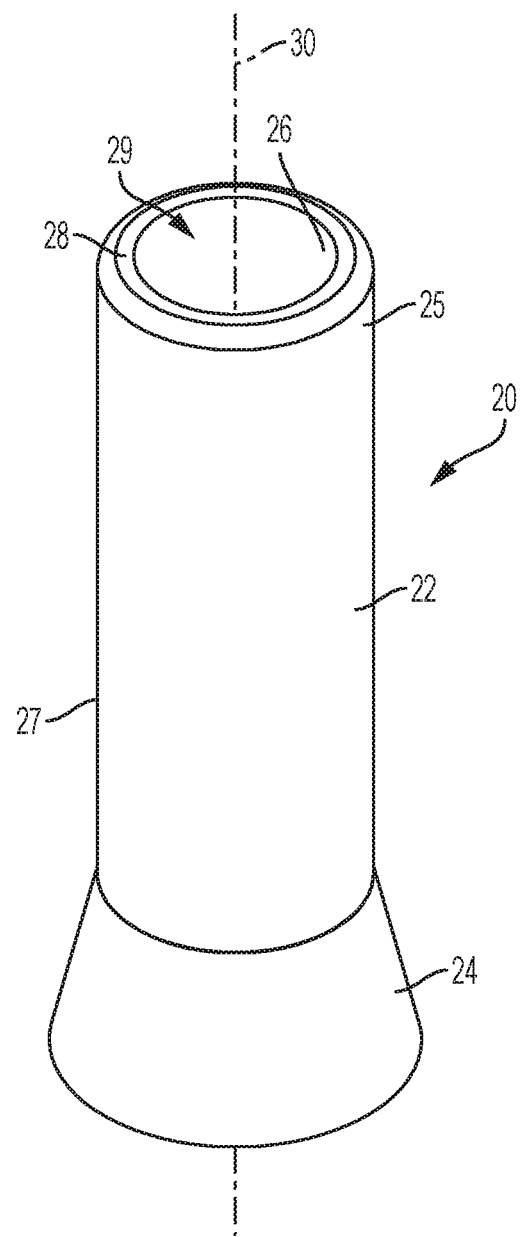
FIG. 2 is a perspective view of an example support member.

In the present description, certain terms have been used for brevity, clarity and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

The present disclosure is described herein using several definitions, as set forth below and throughout the application. Unless otherwise specified or indicated by context, the terms "a", "an", and "the" mean "one or more." For example, "a compound" should be interpreted to mean "one or more compounds."

As used herein, "about," "approximately," "substantially," and "significantly" will be understood by persons of ordinary skill in the art and will vary to some extent on the context in which they are used. If there are uses of these terms which are not clear to persons of ordinary skill in the art given the context in which they are used, "about" and "approximately" will mean plus or minus≤10% of the particular term and "substantially" and "significantly" will mean plus or minus>10% of the particular term.

As used herein, the terms "include" and "including" have the same meaning as the terms "comprise" and "comprising" in that these latter terms are "open" transitional terms that do not limit claims only to the recited elements succeeding these transitional terms. The term "consisting of" while encompassed by the term "comprising," should be interpreted as a "closed" transitional term that limits claims only to the recited elements succeeding this transitional term. The term "consisting essentially of" while encompassed by the term "comprising," should be interpreted as a "partially closed" transitional term which permits additional elements succeeding this transitional term, but only if those additional elements do not materially affect the basic and novel characteristics of the claim.

The present inventor has recognized that conventional rail supporting assemblies that include support members (typically hard wood support blocks) for supporting a contact or third rail (e.g. steel or aluminum rail) that is configured to energize and thereby power a vehicle on the railway system are prone to absorbing water which reduces the electrical insulating properties of the support members. The support members are configured to electrically insulate the contact rail from a base of the rail supporting system and/or an underlying support surface (i.e. railroad tie, steel beam, concrete pad). Reference is made to the above incorporated U.S. Patents for further description of conventional rail supporting assemblies and railways systems that include a contact rail for energizing a vehicle on the railway system.

Through research and experimentation, the present inventor has developed the improved rail support assembly of the present disclosure that includes a lightweight and dielectric support member that resists water absorption and thereby has increased dielectric and electrical insulating properties when compared to conventional support members. The improved rail support assembly and/or the support member of the present disclosure may be advantageously installed as part of a transit or railway system where water absorption may cause the electrical insulating properties of the support member to decrease (e.g. as in wet climates).

FIG. 1 depicts a rail supporting assembly 10 that is configured to support a third or contact rail 6 of a railway system. Reference is made the above incorporated U.S. Patents for further description of example railways systems that include a contact rail configured to energize a vehicle on the railway system. The rail supporting assembly 10 is supported on an underlying support surface 7 (shown in dashed lines) such as a railroad tie, a support beam, concrete pad, compacted dirt, and/or the like.

The rail supporting assembly 10 includes a base 12 that is supported on the underlying support surface 7 and coupled thereto with suitable connectors such as mechanical connectors (e.g. stakes, nuts and bolts, dove tails), adhesives, friction fittings, and/or the like. The base 12 is configured to support a water-resistant and dielectric support member 20 (described further herein). The base 12 defines a bore 13 in which a portion of the support member 20 is disposed. The shape of the base 12 can vary (e.g. rectangular, hollow cylinder with a flange at an end), and the base 12 can be formed from any suitable material such as cast iron, metal, plastic, ceramic, and/or the like.

The rail supporting assembly 10 includes a rail support head 18 that is configured to support the contact rail 6. The rail support head 18 is coupled to the support member 20 relative to the base 12 such that the support member 20 is positioned between the rail support head 18 and the base 12 (i.e. the support member 20 separates the rail support head 18 from the base 12). The rail support head 18 defines a bore 19 in which a portion of the support member 20 is disposed. The rail support head 18 is coupled to the support member 20 by any suitable connector such as mechanical connectors (e.g. stakes, nuts and bolts, dove tails, rivets), adhesives, friction fittings, and/or the like, and the rail support head 18 can be formed from any suitable material such as cast iron, metal, plastic, ceramic, and/or the like.

Referring to FIGS. 2-6 an example support member 20 is depicted. The support member 20 is positioned between the base 12 and the rail support head 18 to thereby support and insulate the contact rail 6 (FIG. 1). The support member 20 has a body 22 that is elongated between a base end 24 disposed in the bore 13 defined in the base 12 (FIG. 1) and a rail end 25 opposite base end 24 disposed in the bore 19 of the rail support head 18 (FIG. 1).

Figure 3:
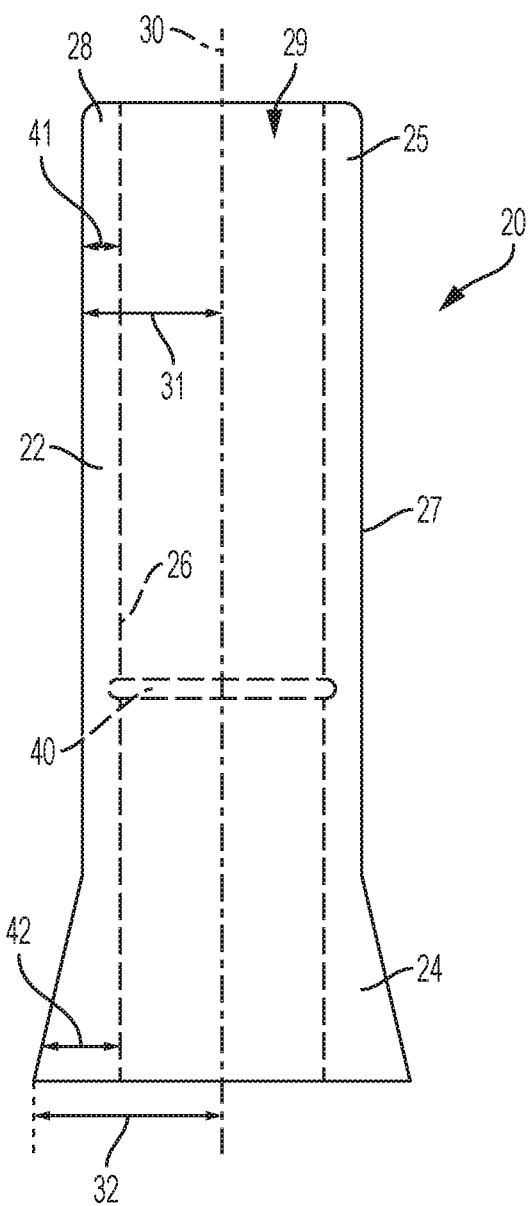
FIG. 3 is a side view of the support member of FIG. 2 with an internal bore and a fracture groove both shown in dashed lines.
Figure 4:
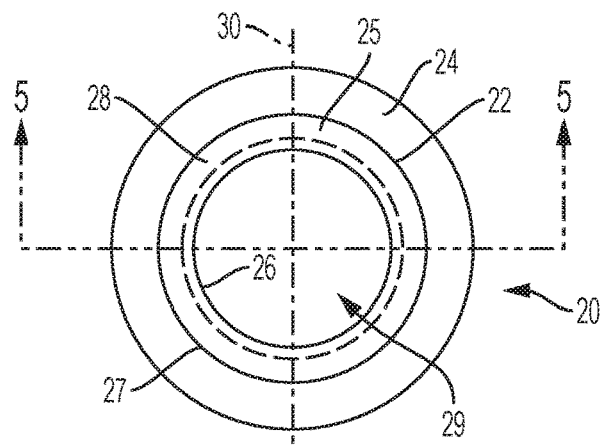
FIG. 4 is a top view of the support member of FIG. 2.
Figure 5:
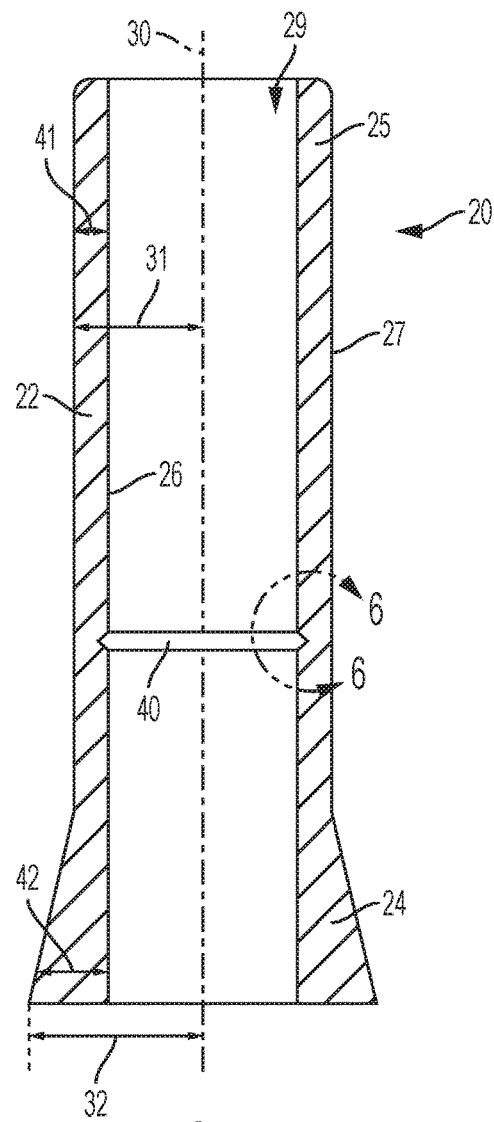
FIG. 5 is a cross section view along line 5-5 on FIG. 4.

The shape of the support member 20 can vary. In certain examples, the support member 20 defines a bore 29 that extends from the rail end 25 to the base end 24 along a center axis 30 such that the support member 20 has an inner perimetral surface 26, an outer perimetral surface 27, and a sidewall 28 defined between the inner perimetral surface 26 and the outer perimetral surface 27. The support member 20 further defines a first outer radius 31 and a second outer radius 32 that is greater than the first outer radius 31 and positioned nearer the base end 24 than the first outer radius 31 (e.g. the outer radius of the support member 20 is greater nearer the base end 24 than the rail end 25) (FIGS. 3 & 5).

The sidewall 28 has a thickness that increases from the rail end 25 toward the lower end (i.e. the thickness of the sidewall 28 is greater nearer the base end 24 than the rail end 25). That is, the sidewall 28 has a first sidewall thickness 41 that is less than a second sidewall thickness 42, and the second sidewall thickness 42 is nearer the base end 24 than the first sidewall thickness 41 (FIGS. 3 & 5). The sidewall 28 and/or the thickness of the sidewall 28 tapers radially inwardly from the base end 24 toward the rail end 25 (see FIG. 3) to thereby increase the vertical stability of the support member 20.

Figure 6:
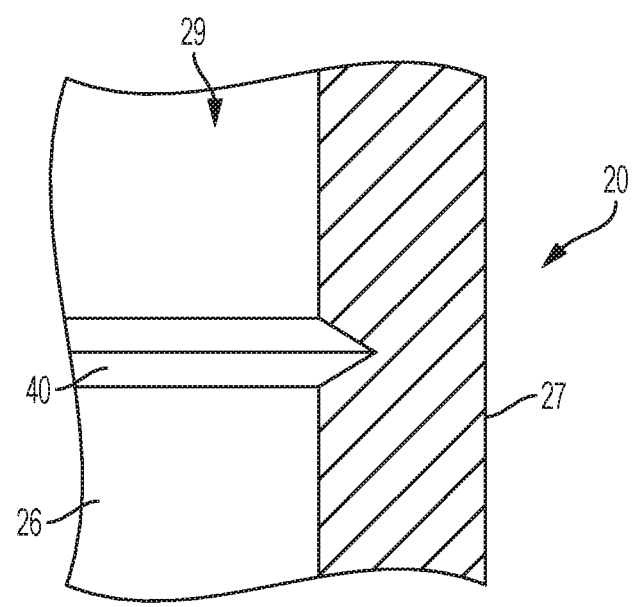
FIG. 6 is an enlarged view within line 6-6 on FIG. 5.

The sidewall 28 defines a fracture groove 40 configured to reduce the thickness of the sidewall 28 to a third thickness and thereby facilitate fracturing of the sidewall 28 at the fracture groove 40 when a fracturing force is applied to the sidewall 28. That is, when a fracturing force is applied to the sidewall 28, the sidewall 28 will fracture (i.e. break, crack) at/along the fracture groove 40. In operation, a fracturing force is applied to the sidewall 28 when an electrical arc event occurs in the rail supporting assembly 10 and/or the support member 20. The location, size, shape, and number of fracture groove(s) 40 can vary, and in the example depicted, the fracture groove 40 is defined in the inner perimetral surface 26 and includes two intersecting planar surfaces (FIG. 6).

Figure 7:
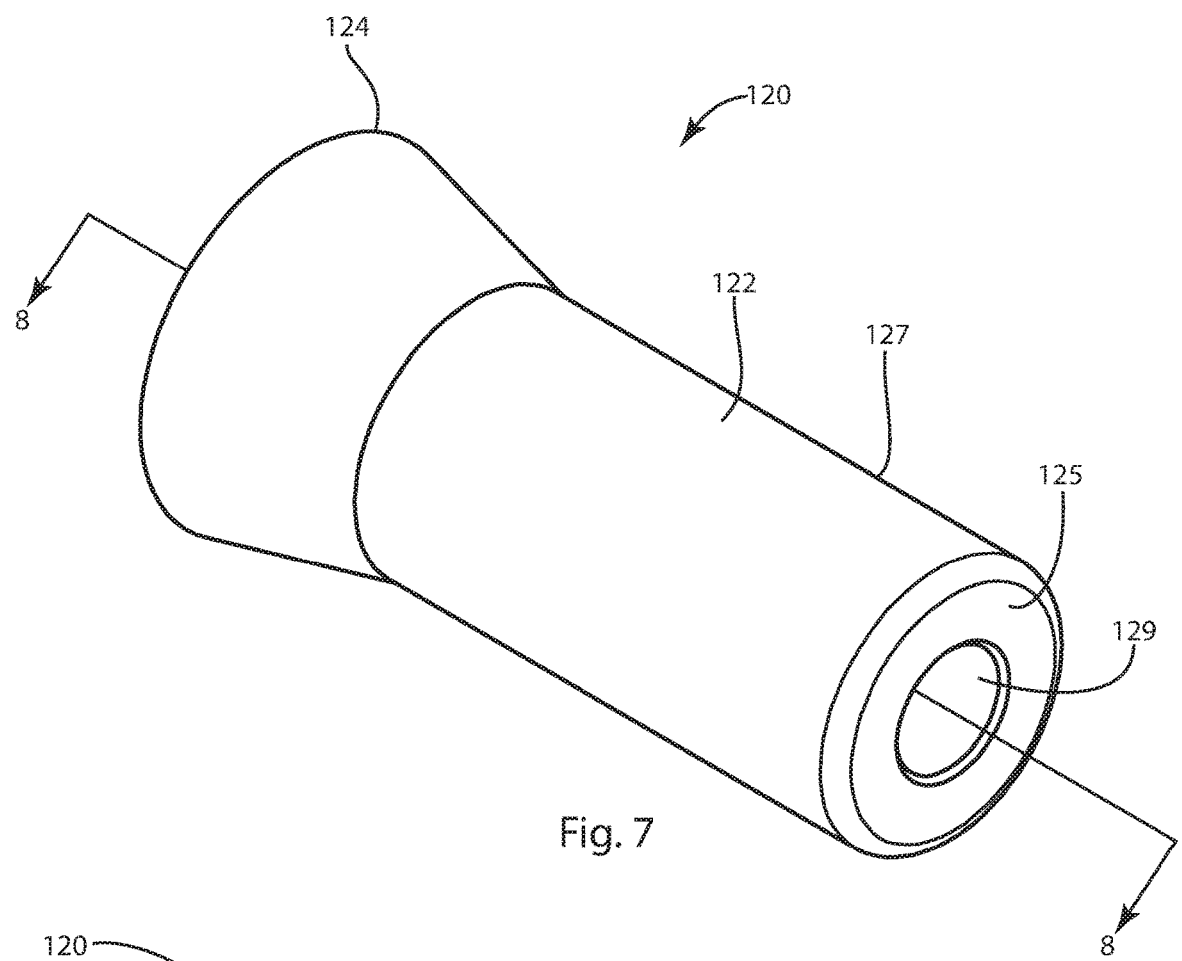
Figure 8:
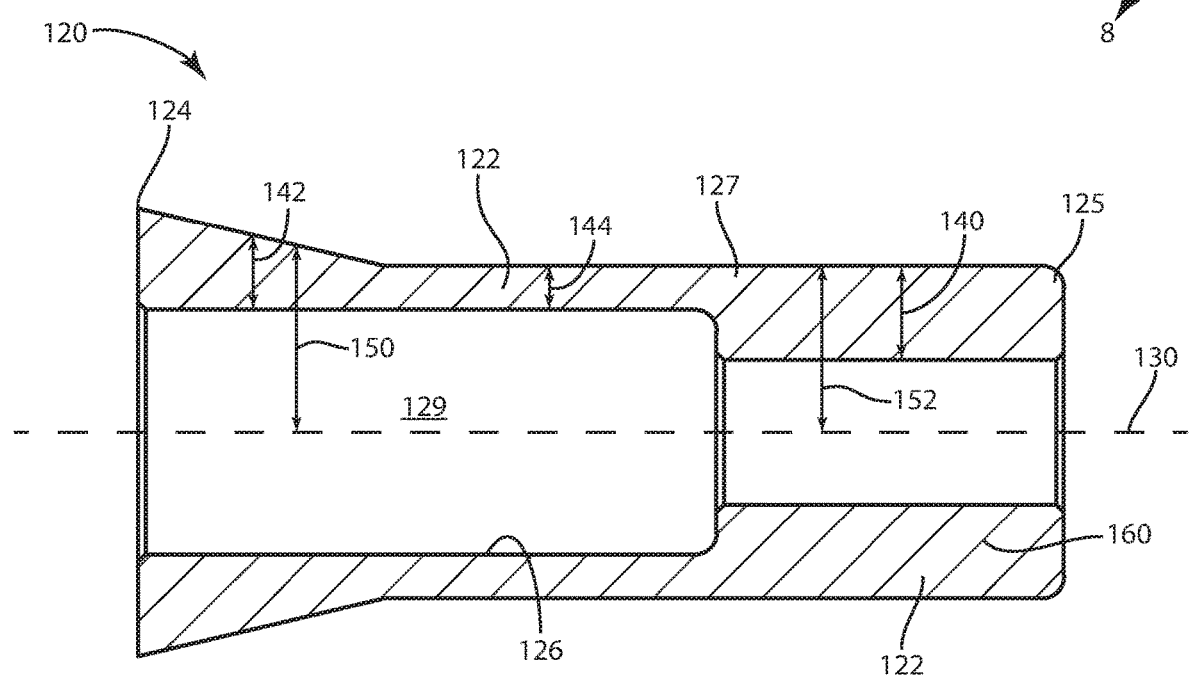

In another embodiment shown in in FIGS. 7 and 8, a support member 120 continues to have a body 122 with an outer surface 127 that is elongated between a base end 124 configured to disposed in the bore 13 defined in the base 12 (FIG. 1) and a rail end 125 opposite the base end 124 that is disposed in the bore 19 of the rail support head 18. A bore 129 extends from the rail end 125 to the base end 124 along a center axis 130 of the body 122. The bore defines an inner surface 126 of the body 122. A sidewall 128 extends between the inner surface 122 and the outer surface 127, the sidewall having at least a first thickness 140, a second thickness 142 and a third thickness 144. The third thickness 144 is less than the first 140 or second 142 thickness and defines a fracture area configured facilitate fracturing of the sidewall 128 when a fracturing force is applied to the sidewall 128 without the need for a fracture groove. In certain embodiments, the third thickness 144 is located intermediately between the first thickness 140 and the second thickness 142. The sidewall 128 has a first outer radius 152 and a second outer radius 150 that is spaced apart from the first outer radius 152 and nearer the base end 124 than the first outer radius 152. The second outer radius 150 is greater than the first outer radius 152 such that the sidewall 128 tapers radially inwardly from the base end 124 toward the rail end 125 to define a rail support structure 160 with increased vertical stability for supporting the contact rail 6. In certain embodiments the tapering of the sidewall 128 toward the rail end 125 is accomplished by a significant increase in the thickness 140 of the sidewall 128 as shown in in FIG. 8. In certain embodiments, the first thickness is approximately two times greater than the third thickness. In other embodiments the third thickness is approximately 1.5, 2.5, 3, 3.5, 4, 4.5 or 5 times greater, than the third thickness.

The support member 20 can be made from any suitable material (e.g. ceramic, metal, insulating material, plastic), and through research and experimentation, the present inventor has determined that the support member 20 preferably comprises a dielectric phenolic material that has good moisture resistance and good mechanical strength. In particular, suitable materials for the support members 20 of the present disclosure may have one or more of the following minimum physical properties:

Dielectric breakdowns (sheet material): Step×step, minimum 35.0 kV/2.5 kV, ASTM D229.

Dielectric strength (sheet material): Short time, minimum 360 Volts per mil, ASTM D229.

Dielectric strength (sheet material): Step×step, minimum 220 Volts per mil, ASTM D229.

Dielectric strength (tube material, perpendicular to laminations): minimum 50.8 Volts per mil, IEC 243-1.

Water absorption: Maximum weight increase 1.6%, ASTM D 229.

Flexural strength (sheet material): Minimum of 16,500 psi lengthwise, ASTM D229.

Flexural strength (tube material): Minimum of 14,500 psi, ISO 178.

Tensile strength (sheet material): Minimum of 11,000 psi lengthwise, ASTM D229.

Compressive strength (sheet material): Minimum of 39,000 psi flatwise, ASTM D695.

Compressive strength, axial (tube material): Minimum of 23,200 psi, ISO 604.

Preferably, the dielectric phenolic material comprises a cellulosic material impregnated with a phenolic resin binder. In certain examples, the cellulosic material impregnated with the phenolic resin binder includes a cotton material such as a continuous cotton woven cloth or a continuous canvas-cotton woven cloth. An example of commercially available dielectric phenolic material suitable for the support member 20 is manufactured by Franklin Fibre—Lamitex Corporation (i.e., a product name Lamitex Grade CE cotton/Phenolic Laminate). The dielectric phenolic materials can be manufactured in various thicknesses, sizes, and shapes including formed as a unitary structural. In other examples, the dielectric phenolic materials may be manipulated to form the shape of the support member (e.g., a sheet of the dielectric phenolic material may be rolled such that the ends are fused to form a cylinder).

The outer perimetral surface 27 and/or inner perimetral surface 26 is coated with a varnish to thereby prevent the dielectric phenolic material of the support member 20 from absorbing water and minimize the amount of particles that stick to the support member 20. The present inventor has determined that the varnish preferably has good moisture resistance and good dielectric strength. In particular, suitable varnishes may meet one or more of the following minimum requirements or physical properties:

Viscosity@25 degrees Celsius (MacMichael): average 230-500 cps

Specific gravity@25 degrees Celsius: average 0.98.

Air-drying time, tack free: average 0.5-1.0 hours (1 mil dry film).

Dielectric strength, dry: minimum 2500 Volts per mil, ASTM D 115-55.

Dielectric strength, 24 hours in water: minimum 600 Volts per mil.

Preferably, the varnish includes a polyester resin or a modified polyester resin (e.g., an alkyd varnish). In certain examples, the varnish comprises glyceryl phthalate. Examples of suitable varnishes are commercially available from Glyptal Inc. (e.g., product nos. 1202 & 9620).

What is claimed is:

1. A rail supporting assembly for supporting a contact rail of a railway system, the rail supporting assembly comprising:
    a base;
    a rail support head; and
    a support member comprising a body constructed of dielectric phenolic material coupled to and positioned between the rail support head and the base to thereby support and insulate the contact rail;
    wherein the support member body has an outer surface, a center axis, a base end;
    a rail end located opposite the base end, and a bore extending from the rail end to the base end along the center axis of the body, the bore defining an inner surface of the body;
    wherein a sidewall extends between the inner surface and the outer surface, the sidewall having at least a first thickness, a second thickness and a third thickness, the third thickness being less than the first or second thickness; and
    wherein the third thickness defines a fracture area configured to facilitate fracturing of the sidewall when a fracturing force is applied to the sidewall.

2. The rail supporting assembly according to claim 1, wherein the dielectric phenolic material comprises a cellulosic material impregnated with a phenolic resin binder.

3. The rail supporting assembly according to claim 1, wherein the dielectric phenolic material is a cotton material impregnated with a phenolic resin binder.

4. The rail supporting assembly according to claim 1, wherein dielectric phenolic material is a continuous cotton woven cloth impregnated with a phenolic resin binder.

5. The rail supporting assembly according to claim 1, wherein the dielectric phenolic material is a continuous canvas-cotton woven cloth impregnated with a phenolic resin binder.

6. The rail supporting assembly according to claim 1, wherein the support member has an outer perimetral surface coated with a varnish configured to prevent absorption of water by the support member.

7. The rail supporting assembly according to claim 6, wherein the varnish includes a modified polyester resin.

8. The rail supporting assembly according to claim 7, wherein the varnish is an alkyd varnish.

9. The rail supporting assembly according to claim 8, wherein the alkyd varnish comprises glyceryl phthalate.

10. The rail supporting assembly according to claim 1, wherein the third thickness defines a fracture groove.

11. The rail supporting assembly according to claim 1, wherein the first thickness defines a rail support structure.

12. A support member for a contact rail supporting assembly comprising:
    a body constructed of dielectric phenolic material having an outer surface and a center axis;
    a base end;
    a rail end located opposite the base end;
    a bore extending from the rail end to the base end along the center axis of the body, the bore defining an inner surface of the body;
    a sidewall extending between the inner surface and the outer surface, the sidewall having at least a first thickness, a second thickness and a third thickness, the third thickness being less than the first or second thickness;
    wherein the third thickness defines a fracture area configured to facilitate fracturing of the sidewall when a fracturing force is applied to the sidewall.

13. The support member according to claim 12, wherein the third thickness is located intermediately between the first thickness and the second thickness.

14. The support member according to claim 12, wherein the first thickness defines a rail support structure.

15. The support member according to claim 12, wherein the first thickness is approximately two times greater than the third thickness.

16. The support member according to claim 12, wherein the sidewall has a first outer radius and a second outer radius that is spaced apart from the first outer radius and nearer the base end than the first outer radius; and wherein the second outer radius is greater than the first outer radius whereby the sidewall tapers radially inwardly from the base end toward the rail end.

17. The support member according to claim 12, wherein the dielectric phenolic material comprises a cellulosic material impregnated with a phenolic resin binder.

18. The support member according to claim 12, wherein the dielectric phenolic material comprises a cotton material impregnated with a phenolic resin binder.

19. The support member according to claim 12, wherein the the dielectric phenolic material is a continuous cotton woven cloth impregnated with a phenolic resin binder.

20. The support member according to claim 12, wherein the dielectric phenolic material is a continuous canvas-cotton woven cloth impregnated with a phenolic resin binder.

21. The support member of claim 12, wherein the outer surface is coated with a varnish configured to prevent absorption of water by the support member.

22. The support member of claim 21, wherein the varnish includes a modified polyester resin.

23. The support member of claim 21, wherein the varnish is an alkyd varnish.

24. The support member of claim 23, wherein the alkyd varnish comprises glyceryl phthalate.

\* \* \* \* \*